(12) United States Patent
Kaestner (10) Patent No.: US 8,990,592 B2
(45) Date of Patent: Mar. 24, 2015

(54) OVERCOMING LIMITED COMMON-MODE RANGE FOR USB SYSTEMS

(75) Inventor: Clemens M. Kaestner, Rosenheim (DE)

(73) Assignee: SMSC Holdings S.a.r.l., Luxembourg (LU)

( * ) Notice: Subject to any disclaimer, the term of this patent is extended or adjusted under 35 U.S.C. 154(b) by 141 days.

(21) Appl. No.: 13/357,987

(22) Filed: Jan. 25, 2012

(65) Prior Publication Data

US 2013/0191566 A1 Jul. 25, 2013

(51) Int. Cl.
*G06F 1/00* (2006.01)
*G06F 13/40* (2006.01)
*G06F 13/42* (2006.01)

(52) U.S. Cl.
CPC .......... *G06F 13/426* (2013.01); *G06F 13/4072* (2013.01)
USPC .......................................................... 713/300

(58) Field of Classification Search
USPC .......................................................... 713/300
See application file for complete search history.

(56) References Cited

U.S. PATENT DOCUMENTS

| | | | | |
|---|---|---|---|---|
| 4,498,141 A * | 2/1985 | Cooper | | 708/212 |
| 5,905,403 A * | 5/1999 | Gillette | | 327/540 |
| 5,974,486 A | 10/1999 | Siddappa | | |
| 6,124,750 A | 9/2000 | Alleven et al. | | |
| 6,188,261 B1 * | 2/2001 | Nosaka et al. | | 327/261 |
| 6,217,389 B1 | 4/2001 | Jatou | | |
| 6,946,904 B1 | 9/2005 | Varma et al. | | |
| 7,167,039 B2 * | 1/2007 | Garrett et al. | | 327/535 |
| 7,212,420 B2 | 5/2007 | Liao | | |
| 7,357,668 B2 | 4/2008 | Wan et al. | | |
| 7,671,630 B2 | 3/2010 | Howe et al. | | |
| 7,689,841 B2 | 3/2010 | Lee | | |
| 7,816,942 B2 | 10/2010 | Howe et al. | | |
| 8,067,957 B2 | 11/2011 | Howe et al. | | |
| 8,347,126 B2 * | 1/2013 | Kou et al. | | 713/300 |
| 2003/0084353 A1 * | 5/2003 | Chang et al. | | 713/300 |
| 2003/0226048 A1 * | 12/2003 | Nguyen et al. | | 713/320 |
| 2005/0269883 A1 | 12/2005 | Drader et al. | | |
| 2006/0020736 A1 * | 1/2006 | Jackson | | 710/313 |

(Continued)

FOREIGN PATENT DOCUMENTS

DE 20023492 U1 7/2004 ............. G06F 13/40

OTHER PUBLICATIONS

USB Port Power Controller with Charger Emulation—Datasheet, SMSC UCS1001, Revision 1.0 (Aug. 18, 2011), 56 pages.

(Continued)

*Primary Examiner* — Faisal M Zaman
(74) *Attorney, Agent, or Firm* — King & Spalding L.L.P.

(57) ABSTRACT

An intelligent level shifter may be added to adjust the voltage level on the data lines (D+ and D−) used for communications in USB systems, to address the issue of missing negative common-mode range as defined by the USB specification. The level shifter may be part of a port power controller that allows adaptive shifting of the signal level in accordance with the current levels drawn on the supply line by a device, for example during charging. The port power controller may be operated in systems enabled for battery charging, and may combine overcurrent sensing (current meter for VBus) and the routing of the D+ and D− lines (used for the battery charging protocol) into a single package. By varying the voltage levels on the D+ and D− data lines according to the drawn current levels, the performance of USB Hosts ports and USB Hub ports may be greatly increased.

16 Claims, 4 Drawing Sheets

(56) References Cited

U.S. PATENT DOCUMENTS

| | | | |
|---|---|---|---|
| 2006/0132192 A1* | 6/2006 | Yu | 327/65 |
| 2008/0176520 A1* | 7/2008 | Matsuo et al. | 455/67.14 |
| 2008/0266740 A1* | 10/2008 | Smith | 361/91.5 |
| 2009/0189569 A1* | 7/2009 | Hsu et al. | 320/160 |
| 2009/0251192 A1 | 10/2009 | Ong et al. | 327/331 |
| 2010/0064148 A1* | 3/2010 | Ho et al. | 713/300 |
| 2010/0064153 A1* | 3/2010 | Gk et al. | 713/310 |
| 2010/0073837 A1 | 3/2010 | Predtetchenski et al. | 361/91.5 |
| 2010/0076615 A1* | 3/2010 | Daniel et al. | 700/293 |
| 2010/0118608 A1* | 5/2010 | Song et al. | 365/185.11 |
| 2010/0264963 A1* | 10/2010 | Kikuchi et al. | 327/157 |
| 2011/0071705 A1* | 3/2011 | Matuszeski et al. | 701/3 |
| 2011/0096579 A1* | 4/2011 | Klodowski et al. | 363/132 |
| 2011/0241580 A1* | 10/2011 | Winterhalter et al. | 318/400.3 |
| 2012/0119696 A1* | 5/2012 | Picard | 320/107 |
| 2012/0144088 A1 | 6/2012 | Chen et al. | 710/316 |
| 2012/0161848 A1* | 6/2012 | Jain | 327/427 |
| 2012/0198250 A1* | 8/2012 | Mizusawa | 713/300 |
| 2012/0249085 A1* | 10/2012 | Lin et al. | 320/162 |

OTHER PUBLICATIONS

International Search Report and Written Opinion, Application No. PCT/EP2013/052109, 11 pages, Oct. 9, 2013.

* cited by examiner

OVERCOMING LIMITED COMMON-MODE RANGE FOR USB SYSTEMS

BACKGROUND OF THE INVENTION

1. Field of the Invention

The present invention relates generally to USB devices, and more specifically to overcoming the limited common-mode range for USB systems.

2. Description of the Related Art

The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off.

The USB specification has seen various revisions, with the USB 2.0 standard challenging the IEEE 1394 interface ("Firewire") as the interface of choice for high-speed digital video, among others. The USB 3.0 standard, representing the second major revision of the USB standard, specifies a maximum transmission speed of up to 5 Gbits/s (640 MBbytes/s), which is over 10 times faster than the maximum speed specified in the USB 2.0 standard (480 Mbits/s). The USB 3.0 standard also features reduced time required for data transmission, reduced power consumption, and is backward compatible with USB 2.0. With the proliferating design of increasingly smarter, faster, and smaller peripherals, the On-The-Go (OTG) Supplement to the USB 2.0 Specification was also developed to address the growing popularity of the portable electronic devices market. OTG devices typically do not require a PC host, and can communicate directly with each other. For example, a PDA may act as a USB host with the capability to print directly to a USB printer, while also acting as a USB peripheral to communicate with a PC. In general, designers are facing increasing pressure to design smaller and faster products in less time and at lower cost.

Present day USB devices that communicate with a host over USB include USB printers, scanners, digital cameras, storage devices, card readers, etc. USB based systems may require that a USB host controller be present in the host system, and that the operating system (OS) of the host system support USB and USB Mass Storage Class Devices. USB devices may communicate over the USB bus at low-speed (LS), full-speed (FS), or high-speed (HS). A connection between the USB device and the host may be established via a four-wire interface that includes a power line, a ground line, and a pair of data lines D+ and D−. When a USB device connects to the host, the USB device may first pull a D+ line high (the D− line if the device is a low speed device) using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

The USB standard provides very stringent guidelines for the allowed common-mode voltage on the differential data lines (D+ and D−). On the other hand, newer specifications allow for battery charging using a USB port, which oftentimes results in currents that are much higher than initially specified for USB, producing higher voltage drops across the USB setups. This can lead to the need for thicker cables and/or reduced cable length when trying to communicate across the USB while the attached USB device is charging. Such change in cabling needs may not allow full backward compatibility for existing cabling infrastructures.

Other corresponding issues related to the prior art will become apparent to one skilled in the art after comparing such prior art with the present invention as described herein.

SUMMARY OF THE INVENTION

In one set of embodiments, an intelligent level shifter may be added to boost and/or attenuate the voltage on both Universal Serial Bus (USB) data lines (D+ and D−) used for communications in USB systems, to address the issue of missing negative common-mode range as defined by the USB specification. The level shifter may be part of a port power controller that allows adaptive shifting of the signal level in accordance with the current levels on the supply voltage line (VBus) provided by the port power controller. The port power controller may be operated in systems enabled for battery charging, and may combine overcurrent sensing and the routing of the D+ and D− lines (used for the battery charging protocol) into a single package. By varying the voltage levels on the D+ and D− data lines according to the current levels (drawn) on the power supply line, the performance of USB Hosts ports and USB Hub ports may be greatly increased.

Thus, in one set of embodiments, a port power controller (PPC) may include a supply bus to provide a supply voltage, a data bus to carry data, and a level shifter to adjust a voltage level of data on the data bus according to the value of the current drawn on the supply bus. In some embodiments the level shifter may also be programmable to adjust the voltage level on the data bus by different levels depending on the direction of the data flow on the data bus. That is, the level shifter may adjust the voltage level on the data bus by a first amount, e.g. according to the current drawn on the supply bus by a device, when data is transmitted to the device, and adjust the voltage level on the data bus by a second amount when data is received from the device. The first amount and the second amount may be independently programmable/controllable. The PPC may provide the supply voltage, and the data with the adjusted voltage levels for transmission to a device. In some embodiments, the data bus includes a USB D+ data line and a USB D− data line. The PPC may include a measurement unit to measure the value of the current drawn on the supply bus, and may generate a control signal based on the measured value of the current drawn on the supply bus to control the level shifter to adjust the voltage level of the data on the data bus. The PPC may generally be used with a data bus that includes a pair of differential data lines, with the level shifter adjusting the voltage level of the data on both data lines of the pair of differential data lines. In some embodiments, to address the issue of a negative common-mode range, when adjusting the voltage level of data on the data bus, the level shifter may increase the voltage level of data on both data lines of the pair of differential data lines by a same amount.

A method for overcoming limited common-mode range on a differential data bus may include providing a supply voltage over a supply bus to a device, receiving data on an incoming differential data bus, adjusting a voltage level of the received data according to a current drawn on the supply bus, and providing the adjusted voltage level data for transmission to the device over an outgoing differential data bus. In adjusting the voltage levels of the data, the method may further include measuring the value of the current drawn on the supply bus, generating a control signal based on the results of the measurement, and adjusting the voltage level of the received data by providing the control signal to a level shifter, with the level shifter increasing the voltage level of the received data according to the control signal.

In some embodiments, the data may be received on a pair of differential data lines that include a D+ data line and a D− data line, and the voltage level of the data on the D+ data line and the data on the D− data line may be adjusted by an equal amount. In some cases the adjustment may include raising the voltage value of the signal to overcome negative common-mode limitations. The method may include transmitting the supply voltage and the adjusted voltage level data over a USB to a USB device.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

Figure 1:
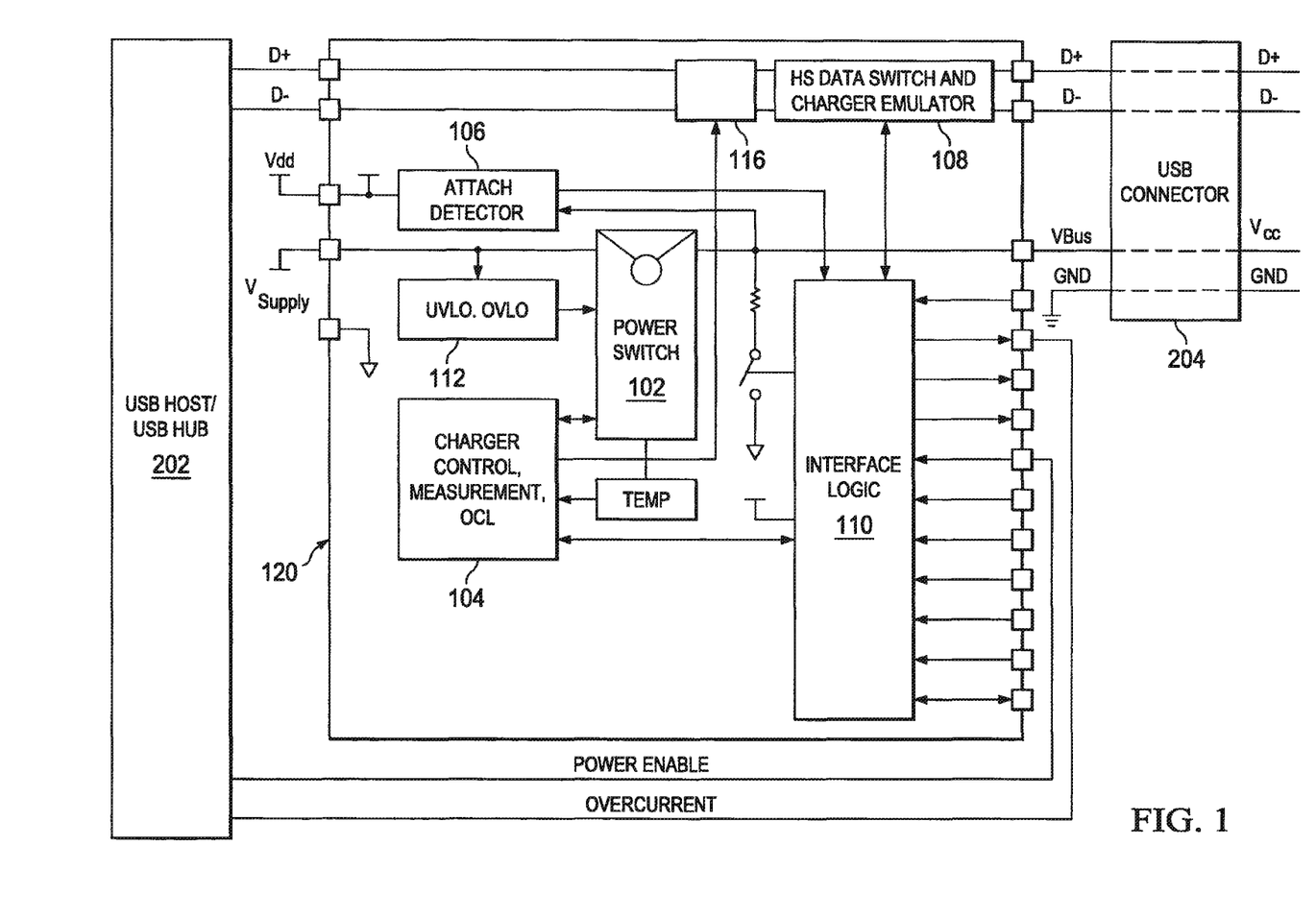
FIG. 1 shows one embodiment of a USB Host system that includes a port power controller with D+/D− level shifting capability.

FIG. 1 illustrates one embodiment of an exemplary USB system, in which a port power controller 120 may be coupled between a USB Host/USB Hub 202 and a USB connector 204, which may be part of a USB device or another USB Hub (not shown). Alternatively, in some embodiments port power controller 120 may be part of a USB host (e.g. a part of USB Host 202), in which case USB connector 204 may represent the USB output of the USB host (i.e., the output of USB host 202). USB power port controller 120 may include an intelligent level shifter 116 coupled in the path of the D+ and D− data lines entering port power controller 120, to potentially boost and/or attenuate the voltage levels on those data lines based on current levels (i.e. the levels of the current flowing) on the VBus line, and on the direction of the data traffic on data lines D+ and D−.

Adding intelligent level shifter 116 in the path of data lines D+ and D− addresses a missing negative common-mode range that is defined by the USB specification. The level shifter may provide adaptive shifting of the signal level in accordance with the levels of the current on the VBus line. Port power controller (PPC) 120 as defined for battery charging enabled systems may combine the overcurrent sensing (current meter for VBus) and the routing of the D+ and D− lines (used for the battery charging protocol) into a single package. Thus, port power controller 120 with level shifter 116 may be used to enhance any USB Host or USB Hub port.

As indicated in the USB 2.0 specification, a high-speed capable transceiver receiver is expected to conform to the receiver characteristics specifications called out in Section 7.1.4.1 of the USB 2.0 specification when receiving in low-speed or full-speed modes. A high-speed capable transceiver which is operating in high-speed mode "listens" for an incoming serial data stream with the high-speed differential data receiver and the transmission envelope detector. Additionally, a downstream facing high-speed capable transceiver monitors the amplitude of the differential voltage on the lines with the disconnection envelope detector.

When receiving in high-speed mode, the differential receiver is expected to have the ability to reliably receive signals that conform to the Receiver Eye Pattern templates shown in Section 7.1.2. of the USB 2.0 specification. Additionally, it is a strongly recommended guideline to design a high-speed receiver to have the ability to reliably receive such signals in the presence of a common-mode voltage component (VHSCM) over the range of −50 mV to 500 mV (the nominal common-mode component of high-speed signaling being 200 mV). Low frequency chirp J and K signaling, which occurs during the Reset handshake, is expected to be reliably received with a common-mode voltage range of −50 mV to 600 mV. These specifications, however, do not address the problems that may be created when charging devices at higher than the initial specified 500 mA rating, and communicating with those devices.

According to the USB 2.0 specification, the voltage drop budget is determined from the following:

The voltage supplied by high-powered hub ports is 4.75 V to 5.25 V.

The voltage supplied by low-powered hub ports is 4.4 V to 5.25 V.

Bus-powered hubs can have a maximum drop of 350 mV from their cable plug (where they attach to a source of power) to their output port connectors (where they supply power).

The maximum voltage drop (for detachable cables) between the A-series plug and B-series plug on VBUS is 125 mV (VBUSD).

The maximum voltage drop for all cables between upstream and downstream on GND is 125 mV (VGNDD).

All hubs and functions must be able to provide configuration information with as little as 4.40 V at the connector end of their upstream cables. Only low-power functions need to be operational with this minimum voltage.

Functions drawing more than one unit load must operate with a 4.75 V minimum input voltage at the connector end of their upstream cables.

Figure 3:
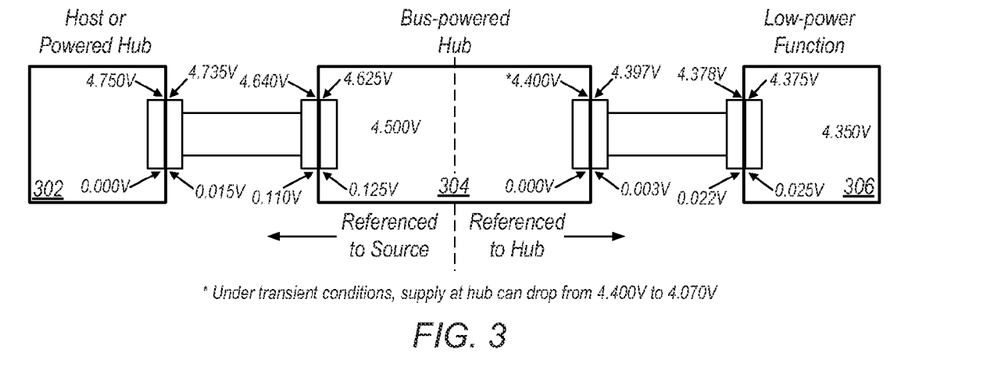
FIG. 3 shows a block diagram illustrating the USB voltage drop budget when drawing 500 mA current on the supply bus.

FIG. 3 shows the values of the minimum allowable voltages in a worst-case topology consisting of a Bus-powered Hub 304 driving a Bus-powered Function 306, where the Bus-powered Hub 304 may be controlled by Host (or Powered Hub) 302. The voltage values shown in FIG. 3 are defined for the 500 mA limit.

Figure 4:
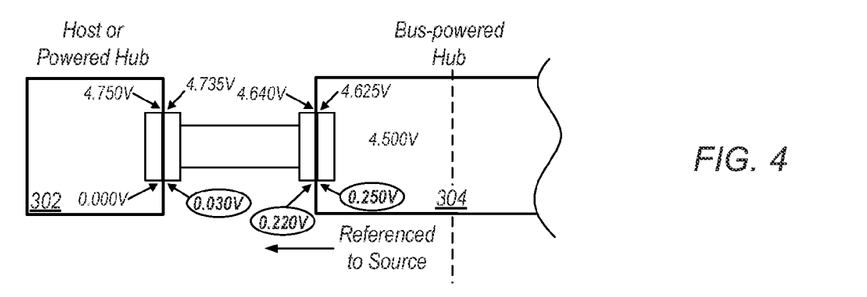
FIG. 4 shows a block diagram illustrating the USB voltage drop budget referenced to source when drawing 1 A current on the supply bus.
Figure 5:
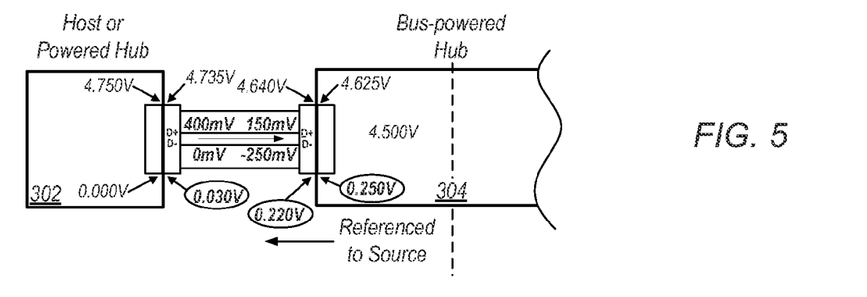
FIG. 5 shows a block diagram illustrating the USB voltage drop budget and signaling levels from the Host to the device when drawing 1 A current on the supply bus.

However, considering the connectivity between Host 302 and Bus-powered Hub 304 and the corresponding voltage values, the voltage values change as shown in FIG. 4, when the device (Function 306, via Bus-powered Hub 304) draws, for example, 1 A (1 Amperes) in charging mode. As seen in FIG. 4, while the supply voltage range could be adjusted when drawing 1 A in charging mode, data communication has to contend with a ground (GND) offset as high as 250 mV. As the encircled voltage values in FIG. 4 indicate, when drawing 1 A, e.g. in charging mode, the GND offset values double from 0.0015V to 0.030V, from 0.110V to 0.220V, and from 0.125V to 0.250V, respectively. FIG. 5 shows the voltages seen on the data lines D+ and D− (as an example) when the Host side 302 sends a signal at 400 mV on D+ and 0V on D− (referenced to the Host GND). The 400 mV (0.400V) is seen as 150 mV on the device side (i.e. in this case at Bus-powered Hub 304), and potentially 0V on the D− line (at Host side 302), assuming that the negative voltage −250 mV is cut off with reference to the device side GND, which in this case is GND at Bus-powered Hub 304. This results in a differential voltage of just 150 mV, which is at the very limits of the USB specification. Communication in the opposite direction is not affected, since the values fall within the allowable, high, positive common-mode range.

Figure 6:
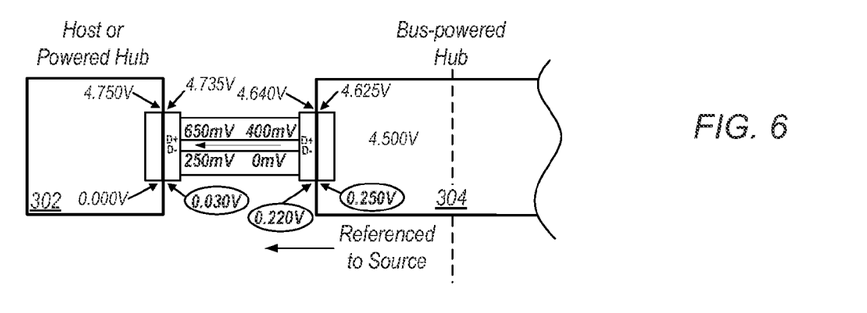
FIG. 6 shows a block diagram illustrating the USB voltage drop budget and signaling levels from the device to the Host when drawing 1 A current on the supply bus.

FIG. 6 shows communication from the Device side (i.e. from Bus-powered Hub 304) to the Host side 302. The GND offset adds to the signal, therefore the differential voltage does stay at the 400 mV level, with 0V on the D− line. Accordingly, the voltages on the Host side are 650 mV on the D+ line and 250 mV on the D− line. It should be noted that the values shown in FIGS. 5 and 6 do not take into consideration any voltage drop on the data lines D+ and D−.

Figure 2:
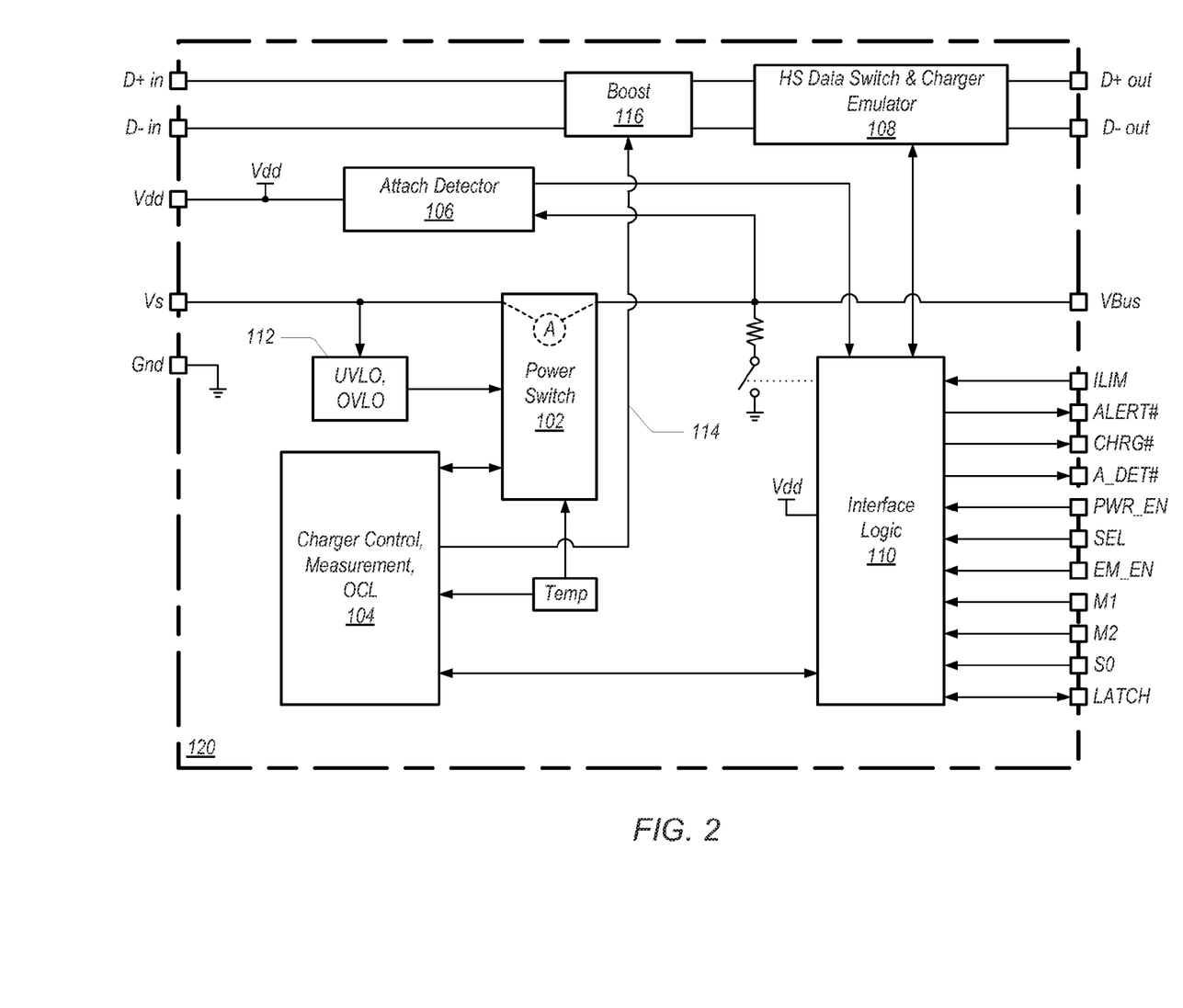
FIG. 2 shows a more detailed partial block diagram of one embodiment of the port power controller of FIG. 1.

One way to overcome the GDN offset is to simultaneously boost the transmitted signal on both the D+ and D− lines on the Host side, when transmitting data to the device. The boost may be related to the actual current flow on the VBus line and the cable length. That is, the level by which the signals are boosted may be related to the actual current flowing in the VBus line. By relating the boost level to the actual current, as opposed to merely setting a static boost level, overshooting the allowed signal level—e.g. in case the current drawn by the device is much lower than expected—may be prevented. As shown in FIG. 2, a (battery charging) Port Power controller may integrate both the current sensing on the VBus line and routing of the D+/D− lines, making it possible to also integrate a flexible boost (and attenuation) mechanism. In one set of embodiments, a flexible boost factor with respect to the GND level on the device side may be implemented as an adaptive boost mechanism in PPC 120. The adaptive boost mechanism enables battery charging on a much higher level while the device is in active communication, independent of additional cable length between the charging port and the device.

FIG. 2 shows a more detailed block diagram of one embodiment of a PPC 120 that includes an adaptive boost mechanism to adjust (increase or decrease) the signal levels on the D+ and D− lines according to a number of input factors, e.g. according to the actual current flow in the VBus line. A system supply voltage ($V_{supply}$) may be provided to PPC 120 at the Vs pin, with PPC 120 providing a voltage output based on Vs ($V_{supply}$) at the VBus pin. That is, $V_{supply}$ may be used as the power source for the downstream devices. In some embodiments, $V_{supply}$ may have a 5V value. In addition, a voltage Vdd may be provided at the Vdd pin, to provide power to interface logic 110, and attach detector 106. In some embodiments, Vdd may have a value of 3.3V. The D+ and D− data lines entering PPC 120 may run through a boost module 116, which may be controlled via a control signal 114 generated by Measurement block 104. Measurement block 104 may operate Power Switch 102 to perform current measurements of the current on the VBus line, and generate control signal 114 according to those current measurements. The boosted D+ and D− signal may be conditioned in Charger Emulator block 108, and the conditioned boosted signals may be provided at the D+ and D− outputs.

In one set of embodiments, boost module 116 may be implemented as a voltage level shifter linked to the actual current drawn by the attached device over the VBus line. As mentioned above, this link may be established by controlling the level shifter 116 from module 104, which may generate control signal 114 based on, among other things, measurements of the current on the VBus via power switch/amp meter 102. Module 104 may further generate control signal 114 based on a number of other factors, for example according to programmable parameters relating to the direction of data flow on data lines D+ and D−. Therefore, the boost/attenuation level may be directly related to a number of programmable factors/parameters, as well as the current on the VBus line, dynamically overcoming any GND offset changes due to increased current being drawn by the device attached to the Host (e.g. to Host 302), for example. Block 112 may be used to provide under-voltage lockout (UVLO) and over-voltage lockout (OVLO) to protect the attached device in case there is an over-voltage or under-voltage condition on the supply line Vs. Furthermore, an overcurrent limit (OCL) value may be programmed/set in block 104 to specify a maximum current level allowed to be drawn by the attached device, and exceeding this limit may result in the generation of an overcurrent event.

For example, referring back to FIG. 5, Host 302 may be designed according to the embodiment shown in FIG. 1. In that case, USB Host 302 may include Host functionality 202, port power controller 120, and physical USB Connector 204. Therefore, USB connector 204 may represent the outputs provided by USB Host 302, including the data signals D+ and D−. Assuming that the device (again, e.g. Function 306 via Hub 304) draws, for example, 1 A in charging mode, what originates as a 400 mV signal from the Host function 202 may be boosted to e.g. 650 mV on the D+ line and 250 mV on the D− line by a level shifter in boost module 116, based on a measured value (of 1 A, in the example case) of the current flowing in the VBus line. Accordingly, the signal at the device side (e.g. at 304) may now appear as a differential voltage of 400 mV, which is no longer close to the very limits of the USB specification. It should be noted that the voltage values above are provided as examples for illustration purposes, and the boost level(s) may be configurable, e.g. in boost block 116 and/or in block 104 as desired. It should further be noted, that in the example provided above the voltage levels on the D+ and D− line are boosted, but the structures disclosed in FIG. 2 may equally be operated to attenuate the signals as may be required, by generating the appropriate control signal(s) 114.

Figure 7:
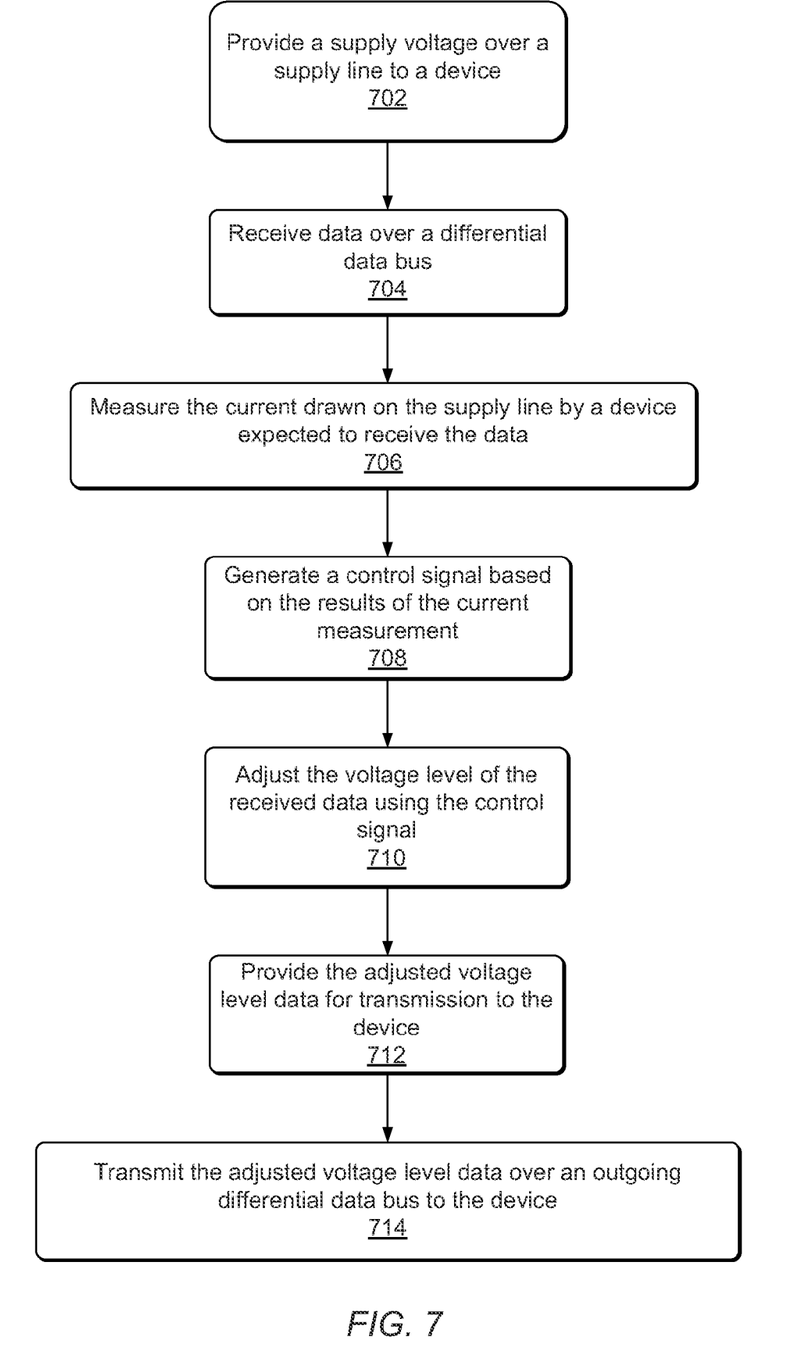
FIG. 7 shows a flow diagram of one embodiment of a method to overcome limited common-mode range on a differential serial bus.

FIG. 7 shows a flow diagram of one embodiment of a method for overcoming limited common-mode range on a differential bus. In 702 a supply voltage is provided over a supply line to a device. In 704 data is received over a differential data bus. In 706 the current drawn on the supply line is measured, and a control signal based on the measurement results is generated in 708. In 710 the voltage level of the received data is adjusted using the control signal. Therefore, the voltage level of the received data may be adjusted according to the level of the current drawn on the supply bus by the device. In 712 the adjusted voltage level data is provided for transmission to the device.

When receiving data over the differential data bus (704), the data may be received over a pair of differential data lines, and the voltage level of the data on each data line of the pair of differential data lines may be adjusted for adjusting the voltage level of the data. Furthermore, when adjusting the voltage level of the data (710) on each data line of the pair of differential data lines, the voltage level of the data on each data line may be adjusted by an equal amount. In 714, the adjusted voltage level data is finally transmitted to the device over an outgoing differential data bus. It should be noted that the flow diagram in FIG. 7 shows data flow to the device, but the same data flow may apply to data received from the device, and the boost level for the transmit and receive path may be individually programmable, for example in blocks 104 and 116, and may allow for both a programmable boost and programmable attenuate, should there be a need to attenuate the data signals.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. For example, while the specific embodiments provided herein focus on the established USB standard, other embodiments may equally be designed to monitor and measure currents drawn on a supply line and or supply bus, and the levels of the differential data may be adjusted according to the current drawn on the supply line by a device also expecting to receive the data.

I claim:

1. A port power controller (PPC) comprising:
 a supply bus configured to provide a supply voltage;
  a data bus distinct from the supply bus and configured to carry data wherein the data bus in comprised of one or more data lines;
  a measurement unit configured to measure the current drawn on the supply bus; and
  a level shifter configured to adjust one or more voltage levels of the one or more data lines,
   wherein the one or more voltage level adjustments uniformly adjust the voltage levels of the one or more data lines by the same amount,
   wherein the one or more voltage level adjustments are made according to a value of the current measured by the measurement unit in order to compensate for the effects of the supply voltage on the voltage levels of the data lines that comprise the data bus, and
   wherein the one or more voltage level adjustments are proportional to changes in the measured current drawn on the supply bus.

2. The PPC of claim 1, wherein the data bus comprises a Universal Serial Bus (USB) D+ data line and a USB D− data line.

3. The PPC of claim 1, further comprising the measurement unit configured to generate a control signal based on the measured value of the current drawn on the supply bus wherein the control signal is used by the level shifter to adjust the one or more voltage levels of the one or more data lines that comprise the data bus.

4. The PPC of claim 1, wherein in adjusting the voltage level of data on the data bus the level shifter is configured to uniformly increase or decrease the one or more voltage levels of the one or more data lines wherein the determination to increase or decrease the voltage levels is based on the direction of the data flow on the data bus.

5. A method for overcoming limited common-mode range on a differential data bus, the method comprising:
 providing a supply voltage over a supply bus to a device;
 receiving data on an incoming differential data bus comprised of one or more data lines;
 measuring the current drawn on the supply bus;
 adjusting one or more voltage levels of the one or more data lines, wherein the one or more voltage level adjustments uniformly adjusts the voltage levels of the one or more data lines by the same amount, wherein the one or more voltage level adjustments are made according to the measured value of the current drawn on the supply bus in order to compensate for the effects of the supply voltage on the voltage levels of the one or more data lines that comprise the data bus, and wherein the one or more voltage level adjustments are proportional to changes in the measured supply bus current; and
 providing data for transmission to the device at the adjusted voltage levels over the outgoing differential data bus.

6. The method of claim 5, further comprising: generating a control signal based on said measuring; wherein said adjusting comprises adjusting the one or more voltage levels of the data using the control signal.

7. The method of claim 6, wherein said adjusting the one or more voltage levels of the one or more data lines using the control signal comprises; providing the control signal to a level shifter; and the level shifter increasing the voltage level of the one or more data lines according to the control signal.

8. The method of claim 5, wherein said differential data lines comprise a D+ data line and a D− data line, wherein said adjusting comprises adjusting the voltage level of the data on the D+ data line and the voltage level of the data on the D− data line.

9. The method of claim 5, wherein the data is Universal Serial Bus (USB) data, the method further comprising transmitting the supply voltage and the adjusted voltage level USB data over a USB to a USB device.

10. A Universal Serial Bus (USB) Host device comprising:
a USB Host function configured to provide USB data signals over differential data lines;
a port power controller (PPC) coupled to the USB Host function, and configured to:
  provide a supply voltage on a supply bus; receive the USB data signals on the differential data lines;
  adjust the voltage levels of the USB data signals on the differential data lines, wherein the voltage level adjustments uniformly adjusts the voltage levels of the differential data lines by the same amount, wherein the voltage level adjustments are made according to a current drawn on the supply bus in order to compensate for the effects of the supply voltage on the voltage levels of the differential data lines, and wherein the voltage level adjustments to the data signals are proportional to changes in the measured supply bus current; provide the supply voltage at a supply port; and provide the USB data signals at the adjusted voltage levels at a data port; and
a measurement unit of the PPC configured to measure the current drawn on the supply bus;
USB connector coupled to the PPC and configured to couple to a USB to transmit the supply voltage and the adjusted USB data signals.

11. The USB Host device of claim 10, wherein the PPC is further configured to; generate a control signal based on the measured current and use the control signal to adjust the voltage levels of the received USB data signals.

12. The USB Host device of claim 10, wherein in adjusting the voltage levels of the received USB data signals the PPC is configured to boost the voltage levels of the received USB data signals wherein the determination to boost the voltage levels is based on the direction of the data flow on the data bus.

13. A system comprising:
a serial bus comprising a pair of differential data lines and a power supply line;
a device coupled to the serial bus; and
a host coupled to the serial bus, and configured to: provide a supply voltage on the power supply line; measure the value of the current drawn on the supply line; provide a pair of differential data signals over the differential data lines; adjust the voltage levels of the differential data signals, wherein the voltage level adjustments uniformly adjusts the voltage levels of the differential data lines by the same amount, wherein the voltage level adjustments are made according to the measured value of the current drawn on the power supply line by the device in order to compensate for the effects of the supply voltage on the voltage levels of the differential data lines, and wherein the voltage level adjustments are proportional to changes in the measured supply bus current; and transmit the pair of differential data signals at the adjusted voltages to the device via the pair of differential data lines of the serial bus.

14. The system of claim 13, wherein the serial bus is a Universal Serial Bus (USB), and the pair of differential data lines comprise a USB D+ line and a USB D− line.

15. The system of claim 13, wherein the host is further configured to: generate a control signal based on the measured current; and adjust the voltage levels of the generated pair of differential data signals using the control signal.

16. The system of claim 14, wherein the host comprises a level shifter, wherein the host is configured to control the level shifter with the control signal to adjust the voltage levels of the generated pair of differential data signals.

* * * * *